(No Model.) 2 Sheets—Sheet 1.
J. P. LAVIGNE.
BICYCLE TIRE.
No. 490,828. Patented Jan. 31, 1893.
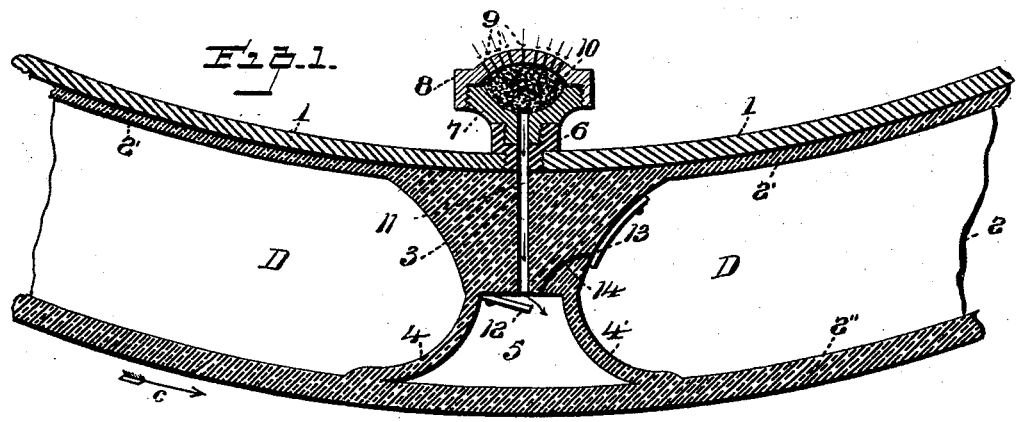
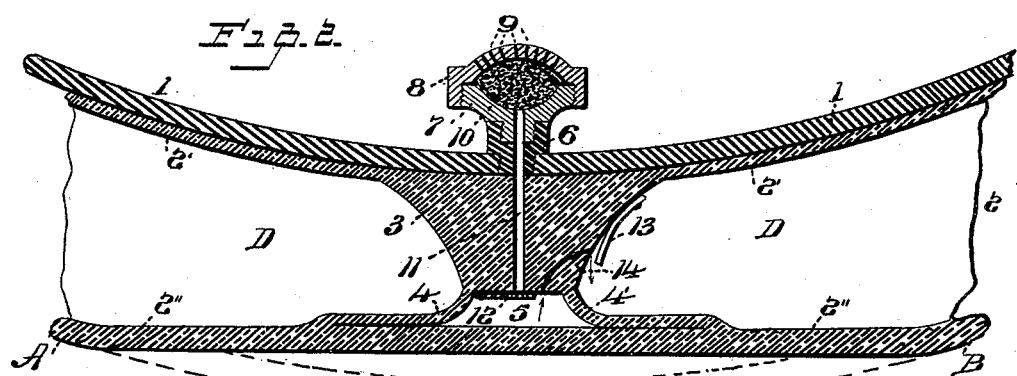
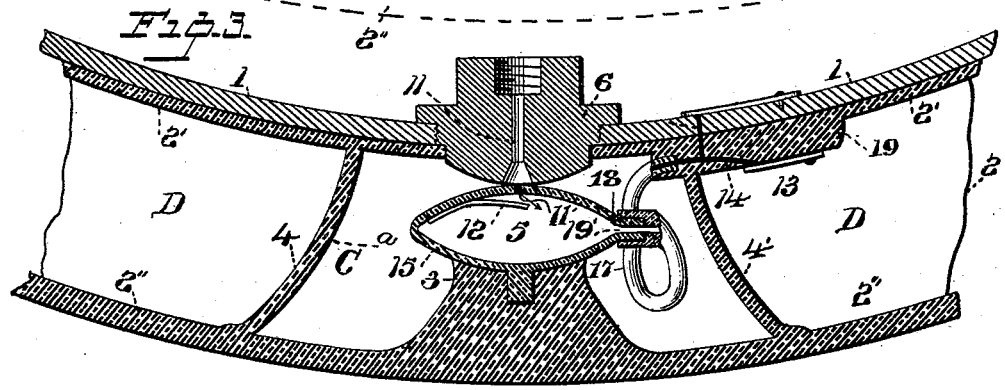
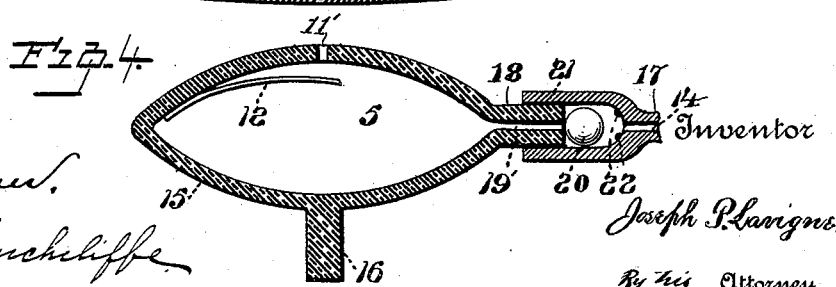
Witnesses
A. J. Tanner
M. C. Hinchcliffe
Inventor
Joseph P. Lavigne
By his Attorney
Geo. O. Phillips (No Model.) 2 Sheets—Sheet 2.
J. P. LAVIGNE.
BICYCLE TIRE.
No. 490,828. Patented Jan. 31, 1893.
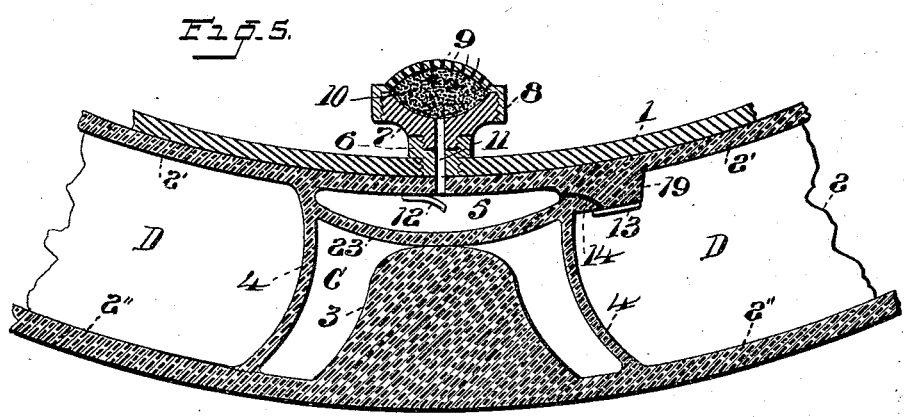
Witnesses
A. J. Tanner.
D. R. Hoyt
Inventor
Joseph P. Lavigne
By Geo. L. Phillips
his Attorney

UNITED STATES PATENT OFFICE.

JOSEPH P. LAVIGNE, OF NEW HAVEN, CONNECTICUT, ASSIGNOR OF ONE-HALF TO REUBEN H. BROWN, OF SAME PLACE.

BICYCLE-TIRE.

SPECIFICATION forming part of Letters Patent No. 490,828, dated January 31, 1893.

Application filed July 6, 1892. Serial No. 439,162. (No model.)

*To all whom it may concern:*

Be it known that I, JOSEPH P. LAVIGNE, a citizen of the United States, and a resident of New Haven, in the county of New Haven and State of Connecticut, have invented certain new and useful Improvements in Air-Compression Chambers for Bicycles, of which the following is a specification.

My invention relates to bicycles, and particularly to an improved device whereby air is automatically supplied to a pneumatic tire by means of the flexible action of said tire due to traction.

To this end my invention consists first, in arranging an air chamber within the tire, adapted to receive and hold air at its normal pressure, raising the same by compression above the pressure of that in the tire, upon which, the contents of the chamber will be admitted thereto, second, to provide means whereby the air chamber may be fully compressed, so that the best possible results may be obtained. Third, surrounding the compressible air chamber by a secondary air chamber also holding air at the normal pressure, so as to protect the first or primary chamber against the higher pressure of the air within the tire. All of which improvements will be more fully described in the following specification and such characteristic features as I believe to be new and novel, particularly pointed out in the claims to follow.

To enable others skilled in the art to which my invention belongs to make and use the same, reference is had to the accompanying drawings in which;

Figure 1, represents a broken section of the tire and rim, and central sectional view of the same, also the anvil against which air is compressed; fixed air chamber, air receiving nozzle for admitting air thereto, all parts being in their normal position. Fig. 2, shows a view of the tire depressed, and, in consequence, a compression of the air chamber, and means for admitting air into the tire from said chamber. Fig. 3, is a broken section of the rim and tire and central section view of the same, sectional view of a detachable air compression chamber; its supporting anvil, secondary air chamber, enlarged air-nozzle base forming a second anvil, between which and the supporting anvil the air chamber is compressed by means of the depression of the tire. Fig. 4, is a central section and detached view of the air chamber, showing a modified form of the outlet valve. Fig. 5, also shows broken section of the tire and rim, and central sectional view of the same, wherein the air compression chamber is fixed on one side of the tire cavity, showing central sectional view of such chamber, anvil for compressing same attached to the opposite wall of the tire cavity, lateral partitions or webs extending across such cavity, forming thereby secondary air chamber; air-nozzle mounted on the rim to admit air to the compression chamber.

Its construction and operation are as follows;

1 represents the metal rim; 2 the pneumatic tire; 2', 2" upper and lower inner walls thereof.

3 is a rib of rubber operating as an anvil extending laterally across the tire and diametrically with respect to the axis of the wheel, a part of the way only.

4, 4' are elastic webs or partitions attached to the outer corners or edges of anvil 3 and to the opposite wall 2" of the tire. Thus forming between said partitions the air chamber 5, wherein the air is first admitted at its normal pressure and compressed sufficiently to be forced against the compressed air within the tire.

6 is a base piece or chair screwed into the inner face of the rim for supporting the air receiving nozzle 7, whose cap 8 is provided with the fine perforations 9 for the admission of air thereto; 10 packing placed within nozzle 7, to arrest particles of dust that would otherwise work through air channel 11 into the air chamber 5.

12 is a flap valve for closing channel 11 when compression takes place in said chamber, and will automatically open when air is exhausted therefrom.

13 is a flap valve operating within the tire, closing the air passage 14 in anvil 13 when the pressure in the tire exceeds that in chamber 5, and opens to admit air from said chamber when it exceeds that in the tire.

Notwithstanding the best material is used in the construction of the tire, there is a constant tendency of the compressed air therein to escape, and, in consequence, it must be replaced. Ordinarily the normal pressure sought to be maintained is about forty pounds, being not quite three atmospheres. This amount gives the best results without subjecting the tire to undue strain and will thus enable it to be sufficiently depressed under the rider's weight to afford good traction. This depressible feature of the tire, I employ to compress the air chamber sufficient to raise the normal atmosphere therein high enough to force it into the cavity of the tire.

The normal amount of pressure required in the tire will govern the distance that anvil 3 will project above the inner wall 2' of the tire, and this will also determine the height or volume of chamber 5, so that, under the maximum pressure of forty pounds, the tire will have sufficient depression for traction, without compressing chamber 5 enough to reduce its volume and consequently increase the pressure of air therein. The pressure of air being inversely as the space it occupies, it is evident, that when it falls in the tire, the area or volume of chamber 5 will be correspondingly reduced, until the pressure therein exceeds that in the tire.

Referring to Fig. 3, for further illustration let C, represent the compression chamber,— anvil 3, and detachable air bag 15 removed therefrom—. Now, it is quite evident, that when the tire is depressed to the point a, it would only represent two atmospheres or thirty pounds, and the pressure in the tire would have to fall below that point before any advantage was gained from compression, and it could not again be raised above that point, besides, this large amount of tire depression would soon prove injurious thereto.

It will be observed from the foregoing, that the air chamber should be capable of full compression, very close to the ordinary traction depression and maximum pressure therein. Therefore, the anvil 3 plays a very important and indispensable part in maintaining this condition, as it would be impossible to produce the desired effect without it.

In Fig. 2 the depression of the tire from A to B, has reduced the volume of chamber 5 nearly two thirds, being amply sufficient to open valve 13 within the tire cavity D. The best results will undoubtedly be obtained when chamber 5 is reduced in volume under the regular traction pressure to a point just under the normal pressure required in the tire, so that, any loss in the tire will instantly reduce the volume and consequently raise the pressure in said chamber. As soon as the ground contact is broken, the resilient action of the tire will restore all the parts to their normal position, viz.; valve 13 closed by pressure in the tire, and valve 12 opened by the pressure of the outer atmosphere rushing in to fill the vacuum or partial vacuum formed in chamber 5. The packing 10 operating to exclude all dust therefrom.

In Fig. 3, precisely the same effect is produced in the use of the detachable rubber bag 15, having stud 16, which enters a hole in anvil 3, thus retaining said bag in place. In this construction, the anvil 3 is placed on the opposite wall 2" of the tire, and does not, as in Figs. 1 and 2, extend across the tire, but is simply a central projection therein; and, in connection with the enlarged air-nozzle base 6 forming thereby one of the anvils between which bag 15 is compressed. Rubber tube 17 connects with neck 18 of bag 15, and air passage 14 in projection 19, and is of sufficient length to enable the bag 15 to be removed for repairs, or replaced by a new one. In this construction, it is also necessary that the bag 15 should be surrounded by air no higher than the normal pressure; therefore the partitions 4, 4' are sufficiently removed from each other to form the chamber C, so as to allow the bag to operate freely without coming in contact therewith. It being readily understood that if the bag were not thus shut off from the tire cavity, as shown, it would remain in a collapsed condition due to the greater pressure in the tire, and thereby exclude the air from without, that should otherwise rush in to fill the vacuum.

In Fig. 4 the ball valve 20, operating within sleeve 21 closes the air passage 19' in neck 18 and is forced therefrom when the bag is compressed. Projecting points 2—2 in sleeve 21 will prevent said ball closing air passage 14 of tube 17. This construction will of course dispense with the use of flap valve 13 and can be more easily constructed.

In Fig. 5 the air chamber 5 is placed close to the inner wall 2 of the tire, and must also be surrounded by the secondary air chamber C and is separated therefrom by flexible diaphragm 23, its width in cross section depending on the width of the anvil 3. In this view, as in the others the anvil forms the most important feature. In Figs. 4 and 5 it must be combined with the secondary air chamber C, while in Figs. 1 and 2 such secondary air chamber will not be required.

I do not therefore wish to be confined to the exact shape of the compressible air chamber, or its exact position within the tire. The gist of my invention consists in the use of an air chamber and means whereby the same may be fully compressed very near the maximum pressure in the tire, and with but a slight variation of the normal traction depression. And the use of a secondary air chamber to protect the primary or compression chamber from the highly compressed air in the tire.

Having thus described my invention, what I claim as new and desire to secure by Letters Patent, is;

1. The herein described improvement in bicycles comprising in combination, a pneumatic tire adapted to hold compressed air, flexible webs or partitions attached to the inner walls thereof, and arranged a suitable distance apart so as to form thereby a normal air-chamber provided with both inlet and outlet ports, substantially as shown; said chamber capable of being compressed by means of the yielding tread of the tire and at a point close to the normal working pressure of the same, and thereby force air into said tire; a vertically disposed anvil to assist in the compression of said chamber, the flexible webs or partitions forming the walls of the chamber being so curved or shaped, combined with their attachment to the inner walls of the tire, that they are able to resist the greater pressure of the air therein, and not collapse when the chamber is in its normal condition, and, by means of the resilient action of the tire, to more readily assume such normal condition after being compressed, substantially as set forth.

2. The herein described improvements in bicycles, comprising in combination, pneumatic tire 2, anvil 3 projecting within the tire and from the inner wall thereof, flexible webs or partitions 4—4' uniting the lower end of said anvil with the opposite wall of the tire, forming thereby the normal air-chamber 5, inlet and outlet ports substantially as shown leading to and from the same, said chamber arranged to be compressed by the yielding tread of the tire and against said anvil, at a point close to the normal working pressure of said tire, forcing air therein, substantially as described; the resilient action of the tire combined with the attachment of the webs or partitions therewith operating to restore the air-chamber to its normal position after compression, substantially as set forth.

3. The herein described improvement in bicycles, comprising in combination, a pneumatic tire, an air chamber therein, into which air is first admitted from without by means substantially as shown, a compression anvil erected on one of the inner walls of the tire, between which anvil, and the opposite wall, said chamber is placed, and between which two points it is compressed by the yielding tread of the tire and close to its normal working pressure, so that the compressed air in said chamber will be forced into the cavity of the tire through an outlet port in said chamber, a secondary normal atmosphere chamber surrounding the primary or compression chamber to protect it from the higher pressure in the tire, substantially as shown.

4. The herein described improvement in bicycles, comprising in combination pneumatic tire 2, anvil 3 projecting from the inner wall and into the cavity thereof, flexible webs or partitions 4—4' uniting said anvil with the opposite wall of the tire, forming thereby the normal air-chamber 5, inlet and outlet ports leading to and from said chamber, substantially as shown, air-nozzle 7 communicating with the inlet port and filled with felt or other suitable packing to exclude particles of dust or other foreign substance from the air chamber, substantially as shown.

5. The herein described improvement in bicycles, comprising in combination a pneumatic tire, a flexible air bulb arranged therein and provided with inlet and outlet ports, anvil or anvils between which the air bulb is placed, and compressed by the yielding tread of the tire, a normal atmosphere chamber surrounding the bulb to protect it from the compressed air in said tire, substantially as shown.

6. The herein described improvement in bicycles comprising in combination, a pneumatic tire, an air bulb arranged therein, having inlet and outlet ports, a dust proof nozzle through which air is admitted thereto, an anvil projecting from one of the inner walls of the tire, between which and the base of the air nozzle or other point substantially as shown, the said bulb is compressed by the yielding tread of the tire so as to expel air therefrom into the cavity thereof; a normal atmosphere chamber surrounding the bulb to protect it from compressed air in said tire, all arranged to operate in the manner substantially as shown and for the purpose set forth.

7. The herein described improvement in bicycles comprising in combination, a pneumatic-tire arranged to hold compressed air; a flexible air pump or chamber having inlet and out-let ports, said pump placed within the tire and arranged to be compressed by the yielding tread of the same, the flexible air pump surrounded by another chamber wherein air is maintained at its normal pressure, such outer or secondary chamber serving to protect the flexible air pump or inner chamber against the collapsing effect of the greater air pressure within the tire, substantially as set forth.

Signed at New Haven, in the county of New Haven and State of Connecticut, this 24th day of June, A. D. 1892.

JOSEPH P. LAVIGNE.

Witnesses:
WILLIAM P. NILES,
CHARLES KLEINER.